United States Patent [19]
Maeda

[11] Patent Number: 5,398,228
[45] Date of Patent: Mar. 14, 1995

[54] PHOTO-DETECTING DEVICE FOR REPRODUCING INFORMATION RECORDED ON AN OPTICAL DISK

[75] Inventor: Takanori Maeda, Saitama, Japan

[73] Assignee: Pioneer Electronic Corporation, Tokyo, Japan

[21] Appl. No.: 127,488

[22] Filed: Sep. 28, 1993

Related U.S. Application Data

[63] Continuation of Ser. No. 856,729, Mar. 24, 1992, abandoned.

[30] Foreign Application Priority Data

Jul. 19, 1991 [JP] Japan .................................. 3-179375

[51] Int. Cl.⁶ .............................................. G11B 7/13
[52] U.S. Cl. ..................................... 369/124; 369/120; 369/44.41
[58] Field of Search ............ 369/124, 112, 118, 44.37, 369/44.11, 44.23, 44.42, 102, 103, 120, 44.41

[56] References Cited

U.S. PATENT DOCUMENTS

| | | | |
|---|---|---|---|
| 4,464,569 | 8/1984 | Reilly et al. | 369/44.23 |
| 4,958,245 | 9/1990 | Roth et al. | 369/44.11 |
| 5,144,616 | 9/1992 | Yasukawa et al. | 369/122 |
| 5,216,562 | 6/1993 | Luecke et al. | 369/44.37 |
| 5,247,510 | 9/1993 | Lee et al. | 369/118 |
| 5,278,812 | 1/1994 | Adar et al. | 369/44.12 |
| 5,283,778 | 2/1994 | Maeda | 369/112 |

FOREIGN PATENT DOCUMENTS

| | | |
|---|---|---|
| 0326354 | 1/1989 | European Pat. Off. . |
| 0370655 | 11/1989 | European Pat. Off. . |
| 0418879 | 9/1990 | European Pat. Off. . |

Primary Examiner—Paul M. Dzierzynski
Assistant Examiner—Kim-Kwok Chu
Attorney, Agent, or Firm—Sughrue, Mion, Zinn, Macpeak & Seas

[57] ABSTRACT

The present invention relates to a photo-detecting device which records/reproduces a signal such as visual information on/from an information recording device such as an optical disk, and more particularly to a structure of a photo detector that receives light reflected from the optical disk, and a method for processing the signal outputted therefrom, and it is an objective of the present invention to obtain a reproduced signal having a good SN ratio without any effect of other signals by a rather simple structure. In order to attain the above objective, a photo-detecting device according to the invention, which is of the type used with an optical system that uses a light beam to read information optically recorded on a recording device wherein the light beam is radiated on and reflected from the surface of the recording device, includes a photo-detecting device having a plurality of light receiving sections for receiving the light beam reflected from the recording device; a digitizing device for digitizing an output signal corresponding to the amount of the light outputted from each of the plurality of light receiving sections in accordance with a predetermined threshold level and a calculating device for repetitively taking a digitized signal outputted from the digitizing device by the frequency more than twice as many as the required maximum level thereof.

4 Claims, 5 Drawing Sheets

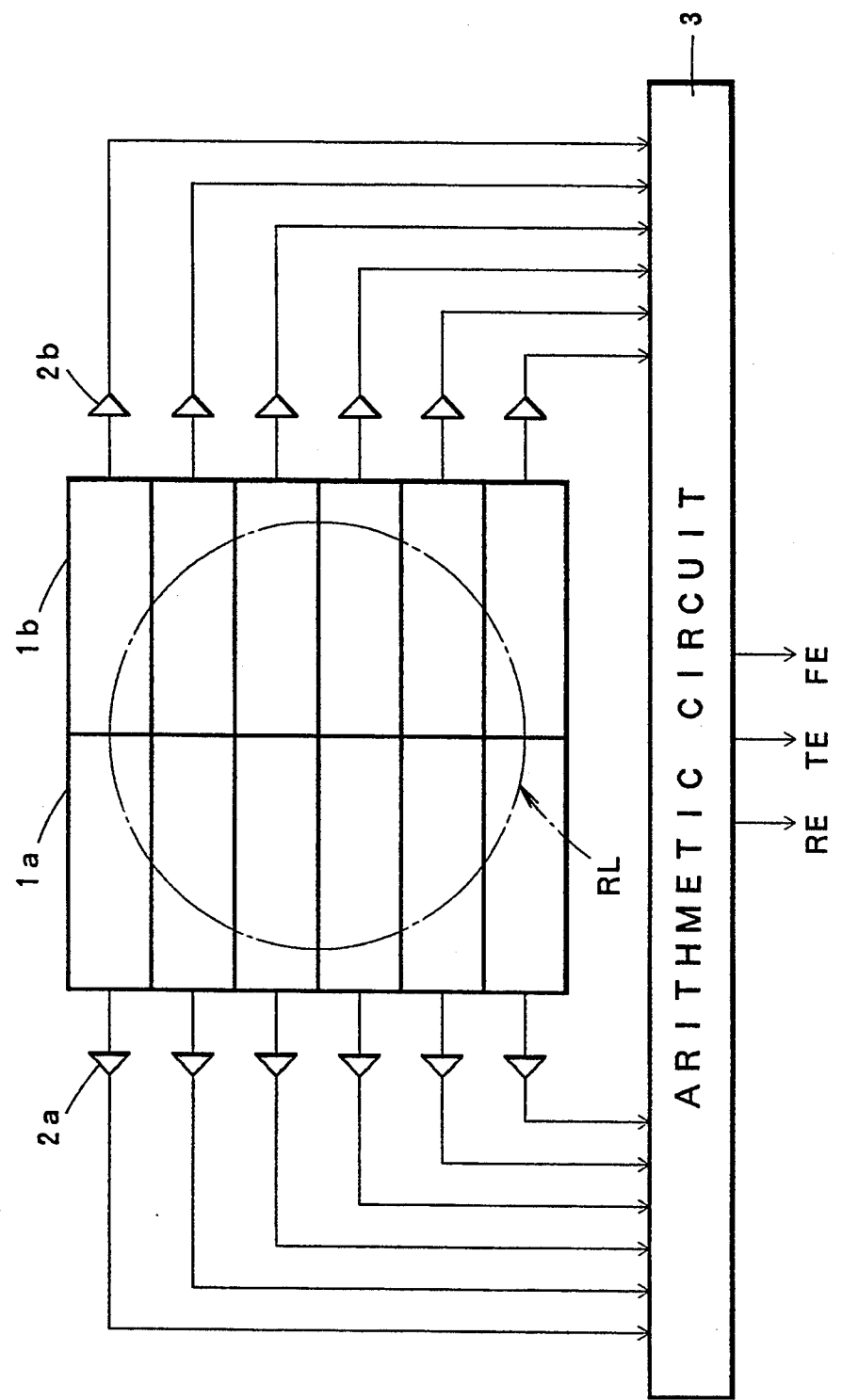

PHOTO-DETECTING DEVICE FOR REPRODUCING INFORMATION RECORDED ON AN OPTICAL DISK

This is a continuation of application Ser. No. 07/856,729, filed Mar. 24, 1992, now abandoned.

BACKGROUND OF THE INVENTION

1. Field of the Invention

The present invention relates to a photo-detecting device which records/reproduces a signal such as visual information on/from an information recording means such as an optical disk, and more particularly to a structure of a photo detector that receives a light reflected from the optical disk, and a method for processing the signal outputted therefrom.

2. Description of the Prior Art

Generally, reading operation of a signal optically recorded on an information recording means such as an optical disk is performed by a photo detector detecting the light reflected from the disk, wherein the photo detector receives the reflected light by a plurality of divided light receiving sections thereof, and obtains a reproduced signal and various servo signals by adding or subtracting the signals outputted from each of the light receiving sections.

For example, FIG. 7 shows a photo-detecting device having a photo diode which is divided into four sections as a photo detector 10, wherein the amount of reflected light RL radiated against the four vertically and horizontally divided light receiving sections Pa, Pb, Pc, Pd is totaled at an adder 11 so as to obtain an RF signal, and a difference between the amounts of light received on the mutually diagonal light receiving sections, that is {(Pa+Pc)−(Pb+Pd)}, is calculated by an adder 12, 13 and a subtracter 14 so as to obtain a focus control signal FE. By the way, an astigmatism generating means should be inserted in the course of the light beam for obtaining this focus control signal FE.

Further, as shown in FIG. 8, an analog camera element composed of a photo-diode array, a charge coupled device or the like has also been adopted as a photo detector 20. Generally, when the number of the divided light receiving elements is increased, a positioning arrangement of the photo detector, which is essential in the embodiment shown in FIG. 7; an arrangement such that the spot of the reflected light RL should be positioned so as to be located on the center of the four light receiving sections Pa, Pb, Pc, Pd, can be obviated as the case of the above photo detector 20, and still further, the amounts of the light received by the respective light receiving sections can also be read out sequentially as analog quantities.

By the way, when a reproduced signal is obtained by the above-described photo-detecting device, if the amount of the reflected light RL radiated to the photo detector is not enough, an induced noise is generated through an effect of the nearby electromagnetic field, and the thus generated noise is mixed with a light-electricity converted analog signal to deteriorate the SN ratio of the reproduced signal.

SUMMARY OF THE INVENTION

The present invention has been made to eliminate such a problem as described above, and it is an object of the present invention to provide a photo-detecting device which is capable of generating a reproduced signal of a good SN ratio, and is not affected by other signals.

In order to attain the above object, a photo-detecting device according to the present invention, which is of the type used with an optical system that uses a light beam to read information optically recorded on a recording means wherein the light beam is radiated on and reflected from the surface of the recording means, comprises: a photo-detecting means having a plurality of light receiving sections for receiving the light beam reflected from the recording means; digitizing means for digitizing an output signal corresponding to the amount of the light outputted from each of the plurality of light receiving sections in accordance with a predetermined threshold level; and calculating means for repetitively taking a digitized signal outputted from the digitizing means by the frequency more than twice as high as the required maximum level of frequency, and obtaining thereby a reproduced signal of the recorded information and a position control signal, wherein the above photo-detecting means may be constructed in such a manner as to be composed of two identical photo-detecting sections, each of which being composed of a plurality of light receiving sections so that the reflected light beam is dividedly received by each of the two photo-detecting sections.

[Action]

A photo-detecting device according to the present invention is constructed such that a photo-detecting means is composed either of a plurality of belt-like light receiving sections or of the belt-like light receiving sections which are further divided by a line crossing at right angles with each of the light receiving sections at respective center portions thereof so as to form two identical photo-receiving sections composed of a plurality of equal-shaped light receiving sections, and the amount of the light outputted from each of the light receiving sections is digitized and converted to a digital signal in accordance with a predetermined threshold level, and further a calculating means repetitively takes a digitized signal outputted from the digitizing means by the frequency more than twice as high as the required maximum level of frequency and thereby generates a reproduced signal of the recorded information and a position control signal.

By this operation, the bad effect possibly caused by other signals crossing in the signal being transmitted can be reduced, and since the center position of the reflected light can be easily obtained, the positioning arrangement of the photo detector can also be greatly facilitated.

Other objects and features of the invention will be more fully understood from the following detailed description and appended claims when taken in conjunction with the accompanying drawings.

BRIEF DESCRIPTION OF THE DRAWINGS

FIG. 6 is an illustration showing another embodiment of the photo-detecting device according to the present invention;

Figure 1:
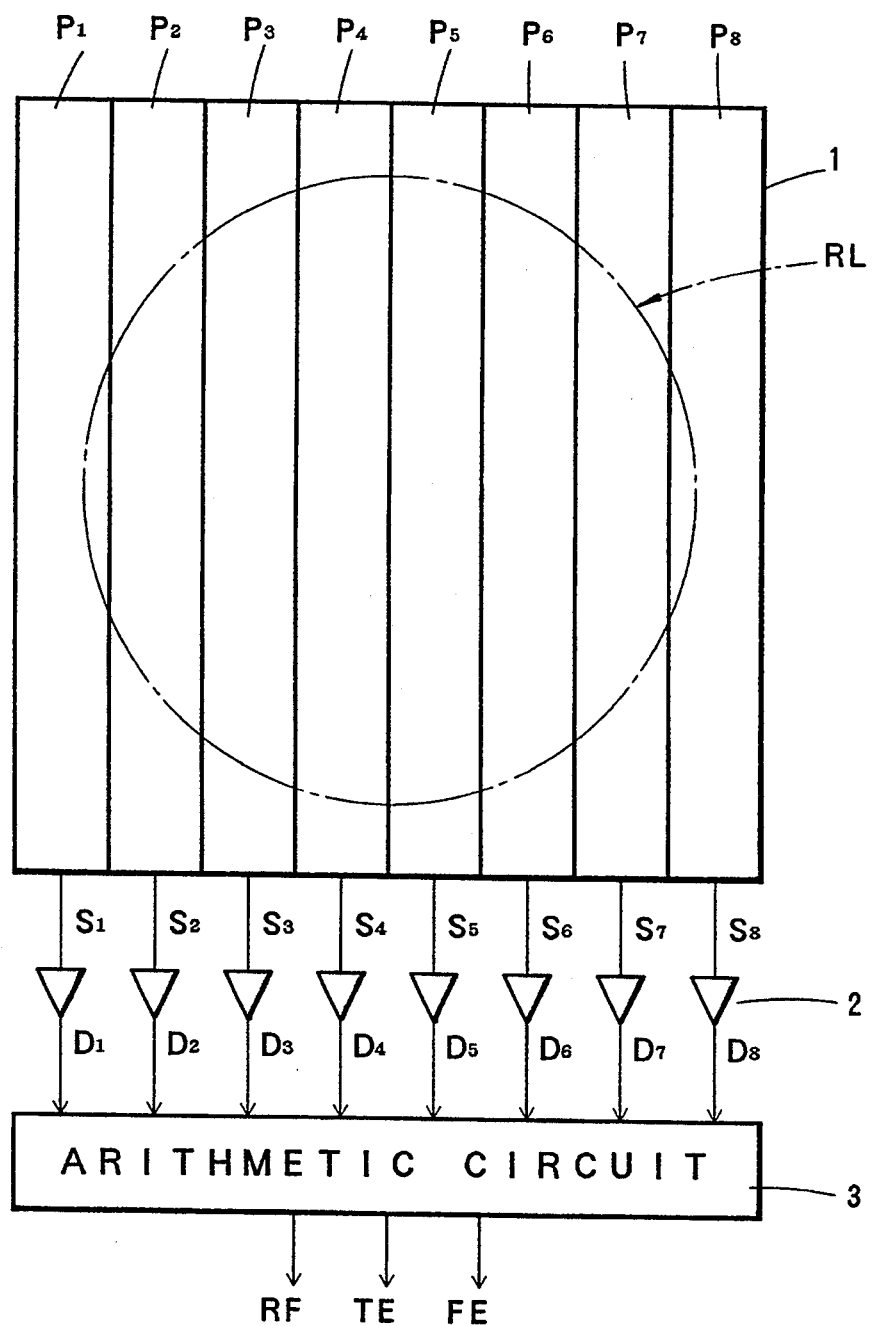
FIG. 1 is an illustration showing one embodiment of a photo detecting device according to the present invention.

In the figures, reference numerals 1a and 1b respectively denote a photo detector, reference numerals 2a and 2b respectively denote a buffer, numeral 3 denotes a arithmetic circuit, reference character RL denotes a reflected light and DL denotes a diffracted light.

DETAILED DESCRIPTION OF THE PREFERRED EMBODIMENTS

In the following, preferred embodiments of the present invention are described with reference to the drawings.

FIG. 1 is an illustration showing a structure of one embodiment of a photo-detecting device according to the present invention. In the figure, a photo detector 1 is composed of a silicon photo diode which is divided into a plurality of belt-like optical sensors P1 to P8, wherein when a reflected light RL is radiated against the surface thereof, the electric signals corresponding to the amount of lights received by the respective optical sensors P1 to P8 are outputted as output signals S1 to S8.

A buffer 2 converts the output signals S1 to S8 outputted from the respective optical sensors P1 to P8 into digital signals D1 to D8 by a predetermined threshold level Th, and supplies these signals to an arithmetic circuit 3. The arithmetic circuit 3 calculates an RF signal, a tracking error control signal TE and a focus error control signal FE from the digital signals D1 to D8 inputted thereto, and outputs each of these signals.

Meanwhile, operation of the present invention is described in the following, with reference to the case for reading out a recorded information from an optical disk such as a CD in which the information is recorded by various phase pits.

Figures 2A, 2B:
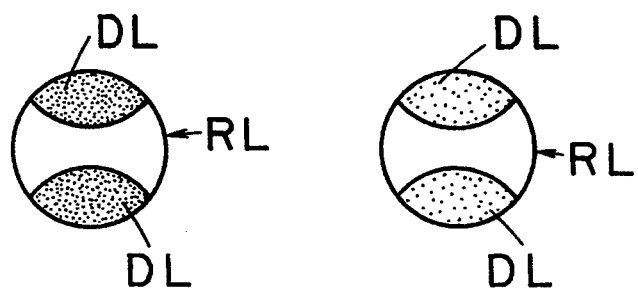
FIG. 2A and 2B are far-field views respectively showing the reflected lights radiated to a photo detector.

First of all, when a light beam is radiated on a track of the optical disk in such a manner that the light beam is focussed on the track line for reading out the information recorded on the optical disk, a diffracted light DL generated by a pit is observed, as shown in FIGS. 2A and 2B, in far-field views each showing the reflected light RL which is radiated against a photo detector 1. Here, FIG. 2A is a far-field view showing a case that the amount of the light received through the pit is minimum, and FIG. 2B is a far-field view showing a case that the amount of the light received through the pit is maximum.

The position of the diffracted light DL varies in accordance with the size of a pit, that is, with a spatial frequency in the longitudinal direction on a track line. Although a case that the diffracted light is modulated only by a so-called signal frequency in the longitudinal direction is described in this embodiment, however, there is a diffracted light in the lateral direction as a matter of fact, since the pits are generally constructed in two dimensions; lateral and longitudinal directions. Accordingly, this diffracted light in the lateral direction may be used for tracking along a track line on which information is recorded, the operation of which will be described hereinafter.

Figures 3A, 3B:
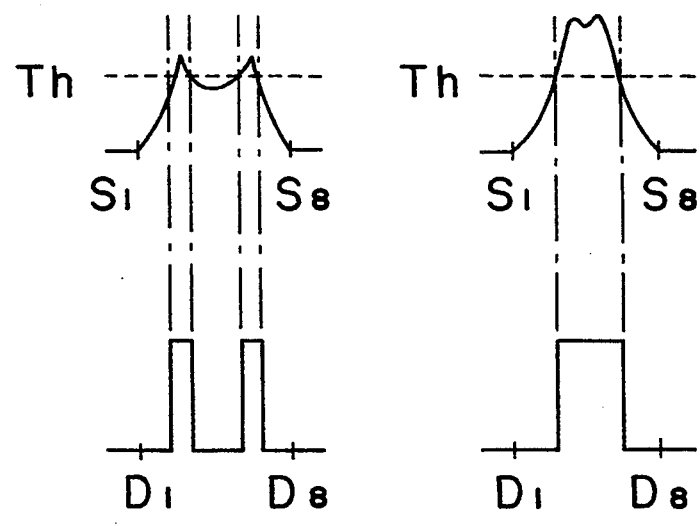
FIGS. 3A and 3B are illustrations, each showing a distribution of the amount of the reflected light and a digital signal corresponding respectively to FIGS. 2A and 2B.

When the photo detector 1 receives the above reflected light RL, distribution of the light received by the respective optical sensors P1 to P8 represents a mountain-like envelope as shown in FIG. 3. The buffer 2 converts the output signals S1 to S8 received from the respective optical sensors P1 to P8 into digital signals D1 to D8 by a predetermined threshold level Th. By the way, the waveforms shown in FIGS. 3A and 3B correspond respectively to the reflected lights shown in FIGS. 2A and 2B.

An arithmetic circuit S counts the number of the sensors showing logic "1" within the digital signals D1 to D8, and thereby total amount of the light received by the photo detector 1 is thus detected. This detecting operation repeats more than twice as fast as a required signal frequency, and the recorded signal is demodulated by a digital processing conducted on the basis of the result of the above counting operation. By the way, the signal processing conducted in the arithmetic circuit 3 detects a deviation of the light beam, a change in the amount of the received light and so on caused due to a secular change, and automatically amends the thus obtained result.

Figure 4A:
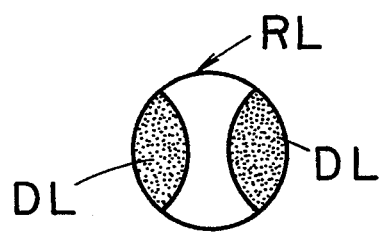
FIGS. 4A and 4B are far-field views in which diffracted lights of the reflected light respectively radiated to the photo detector are shifted by an angle of 90 degrees from the case of FIGS. 2A and 2B.
Figure 4B:
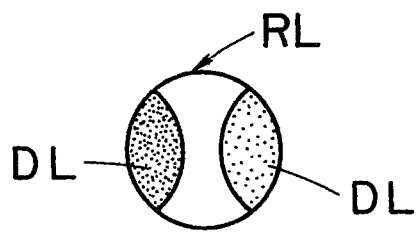
Figure 5A:
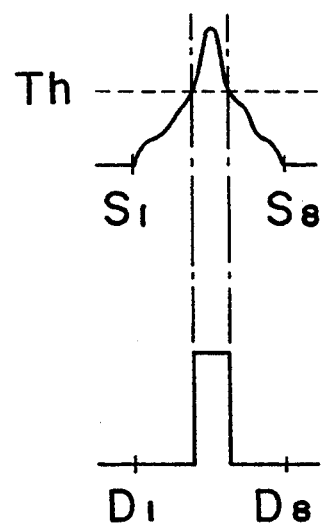
FIGS. 5A and 5B are illustrations, each showing a distribution of the amount of the reflected light and a digital signal corresponding respectively to FIGS. 4A and 4B.
Figure 5B:
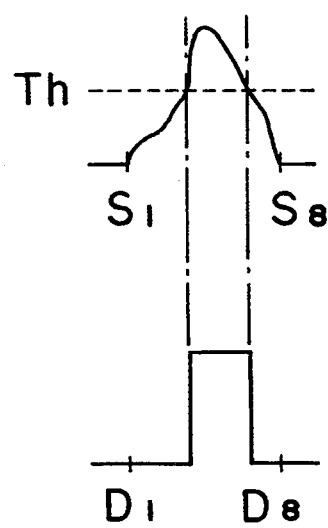
Figure 7:
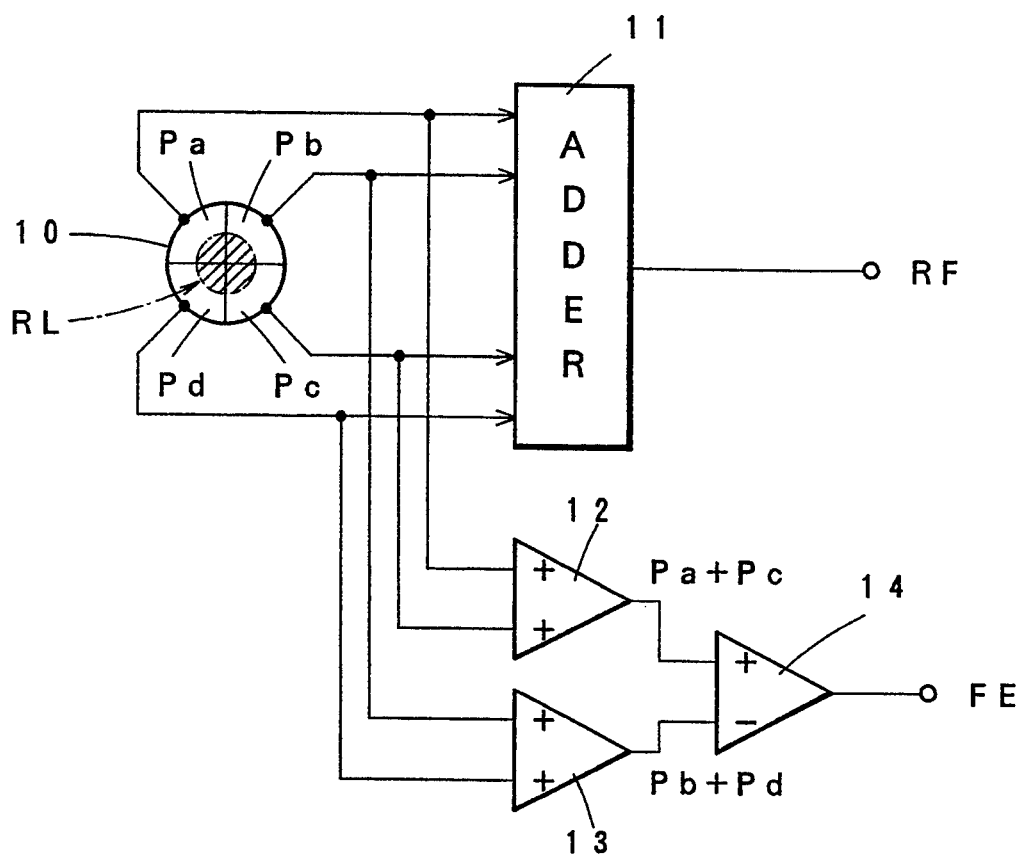
FIG. 7 is an illustration showing a photo detecting device according to the prior art.
Figure 8:
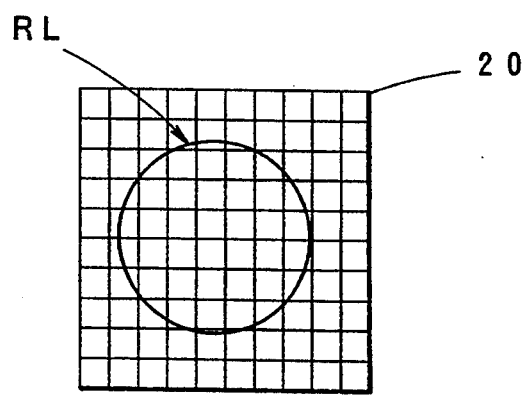
FIG. 8 is an illustration showing a photo detector using an analog camera element.

Secondly, a case that the diffracted light exists in the direction shifted by an angle of 90 degrees is explained. The diffracted light DL in this case appears such that they are facing against each other in the lateral direction as shown in FIGS. 4A and 4B. Here, if the spot of the light beam is radiated correctly on a track line of the optical disk, the level of the light strength at the respective left and right sides become equal as shown in FIG. 4A, but if it is radiated on a point deviated from the track line, then the balance between the right side and left side will be lost as shown in FIG. 4B, and distribution of the amount of lights on the respective optical sensors P1 to P8 and the result of the digitizing processing thereof in the above both cases will respectively be as shown in FIGS. 5A and 5B. Thus, by comparing the calculated results of the respective left and right sides as a digital value, tracking error control signal TE can be obtained. By the way, a repetitive frequency scanning the arithmetic circuit 3 has to be more than twice as many as that of the tracking control band for acquiring the tracking error control signal TE. However, in the case that a recorded signal in the broad band should also be read out, only the low frequency composition out of the signals formed by the difference between the right and left side of the calculated result can be used as a tracking control signal by use of a median filter method or the like.

As has been described above, if the photo detector is composed of a plurality of belt-like light receiving sections, since the center of an average value of the area where the logic "1" exists in a substantially long period, or the center of the range of the logic "1" at the disk surface regarded as being a base can be perceived as the center of the distribution of the light amount by the arithmetic circuit 3, no positioning arrangement on the surface of the photo detector will be necessary, as with the conventional case in which positioning arrangement was not necessary in performing analog processing using a diode array. Further, since the width of a spot of the light reflected on the photo detector can be obtained from an average value of the area where the logic "1" is distributed thereon in a substantially long period, or from the value on a disk surface regarded as being the basic surface, the arrangement of the focal position can also be performed by controlling this value to be a constant value.

FIG. 6 is an illustration showing a structure of a further embodiment of a photo-detecting device according to the present invention. In this embodiment, the reflected light is individually detected by two divided photo detectors 1a and 1b whose structures are respectively identical with the above-described photo detector 1, the output from the photo detector 1a is fed to an arithmetic circuit 3 by way of a buffer 2a, and the output from the photo detector 1b is fed to the arithmetic circuit 3 by way of a buffer 2b respectively.

By this structure, signal detection and focus detection can be performed from the results of the respective photo detectors 1a and 1b as is equally done in the first embodiment, and by comparing the detected result of the low frequency signal of the photo detector 1a and that of the photo detector 1b, the tracking error control signal TE can be obtained by way of a push-pull method. Conventionally, there has been a problem that if the pits are short, in other words, if the spatial frequency is high, the portion of the diffracted light DL becomes substantially small, whereby a signal modulation rate; a so-called MTF (Modulation Transfer Function) character falls at high frequency and therefore signal detection at high frequency becomes rather difficult. However, the structure of this embodiment compensates the MTF characteristic by minimizing the reference threshold level of calculation.

In the above embodiments, all the optical sensors are explained as if they are of the same size and shape, in fact, they can be constructed in different size and shape from one another. The size and the number of divided sections of a photo detector can be determined in accordance with the strength of distribution of the light, width of a change in the amount of the reproduced light, and with a required precision of the detected signal and so on.

Further, although a threshold level of the buffer 2 is settled as a constant value in this embodiment, it can be constructed as variable in accordance with the output value and drive electric current of the semiconductor laser, and with the amount of light obtained by the photo detector. The threshold level can also be settled as variable in accordance with the position to be detected, wherein the threshold level is minimized at an end position of the light distribution and so on.

Furthermore, it can also be constructed such that plural number of times of digitization is performed by varying the threshold value, so that precision can be improved with a reduced detection frequency.

And further, although it is constructed such that a push-pull method is used for detecting a tracking error in the above embodiment, it can be constructed as using a method in which three light beams are received by the photo detector. And still further, the focal point is detected by measuring the beam size in the above embodiment, it can be constructed such that it is detected by a knife-edge method, astigmatism method and a wedge-prism method or the like.

[Effect of the Invention]

By using a photo-detecting device according to the present invention, a bad effect caused by other signals mixed with a signal to be reproduced can be reduced, and positioning arrangement of a photo detector can be greatly facilitated.

While the invention has been described with reference to specific embodiments, the description is illustrating and is not to be construed as limiting the scope of the invention. Various modifications and changes may occur to those skilled in the art without departing from the spirit and scope of the invention as defined by the appended claims.

What is claimed is:

1. A photo-detecting device for use with an optical information system that uses a light beam to read information optically recorded on recording means, wherein said light beam is radiated on and reflected from the surface of said recording means, said photo-detecting device comprising:

photo-detecting means having a plurality of divided light receiving sections for receiving the light beam reflected from said recording means;

digitizing means for digitizing an output signal to either one of logic "1" and "0" corresponding to an amount of light outputted from each of said plurality of light receiving sections in accordance with a predetermined threshold level; and calculating means for respectively scanning digitized signals outputted from said digitizing means to count light receiving sections showing logic "1" with a frequency more than twice that of an actual readable maximum frequency for correct reproduction of a signal from said recording means corresponding to a maximum readable spatial frequency from said recording means, and obtaining thereby a reproduced signal of said information optically recorded and a position control signal.

2. A photo-detecting device as claimed in claim 1, characterized in that said photo-detecting means comprises a plurality of belt-like light receiving sections.

3. A photo-detecting device as claimed in claim 1 or 3, further comprising means for varying said threshold level for digitization in accordance with the amount of light received by said photo-detecting means.

4. A photo-detecting device for use with an optical information system that uses a light beam to read information optically recorded on recording means, wherein said light beam is radiated on and reflected from the surface of said recording means, said photo-detecting device comprising:

photo-detecting means divided by two identically formed photo-detecting sections, each of said photo-detecting sections comprising a plurality of divided light receiving sections for receiving the light beam reflected from said recording means, whereby said reflected light beam is dividedly received by each of said two photo-detecting sections;

digitizing means for digitizing an output signal to either one of logic "1" and "0" corresponding to an amount of light outputted from each of said plurality of light receiving sections of said two identically formed photo-detecting sections in accordance with a predetermined threshold level; and calculating means for repetitively scanning digitized signals outputted from said digitizing means to count light receiving sections showing logic "1" with a frequency more than twice that of a maximum level required for a correct reproduction of a signal, and obtaining thereby a reproduced signal of said information optically recorded and a position control signal.

* * * * *